United States Patent

[11] 3,612,164

[72] Inventor Robert G. Miner
 La Crosse, Wis.
[21] Appl. No. 29,435
[22] Filed Apr. 17, 1970
[45] Patented Oct. 12, 1971
[73] Assignee The Trane Company
 La Crosse, Wis.

[54] MULTIZONE AIR CONDITIONING APPARATUS
 10 Claims, 1 Drawing Fig.

[52] U.S. Cl. .................................................. 165/22
[51] Int. Cl. ................................................. F24f 3/00
[50] Field of Search ............................. 165/16, 22, 50

[56] References Cited
 UNITED STATES PATENTS
 2,238,688 4/1941 Guler .......................... 165/27
 2,708,568 5/1955 Marshall ...................... 165/16

Primary Examiner—Charles Sukalo
Attorneys—Arthur O. Andersen, Carl M. Lewis and Malcolm L. Moore ABSTRACT: A multizone air conditioning apparatus is shown having both a heating deck and a cooling deck. Each deck has a plurality of outlets each leading to one of a plurality of zones to be air conditioned. Each zone is provided with thermostatic control means for selecting the desired amount of air from the heating and cooling decks. The amount of heat exchange medium delivered to each of the heating and cooling decks is controlled in response to the rate of airflow through each of the decks as measured by the pressure differential across the heat exchanger of each of the heating and cooling decks PATENTED OCT 12 1971 3,612,164
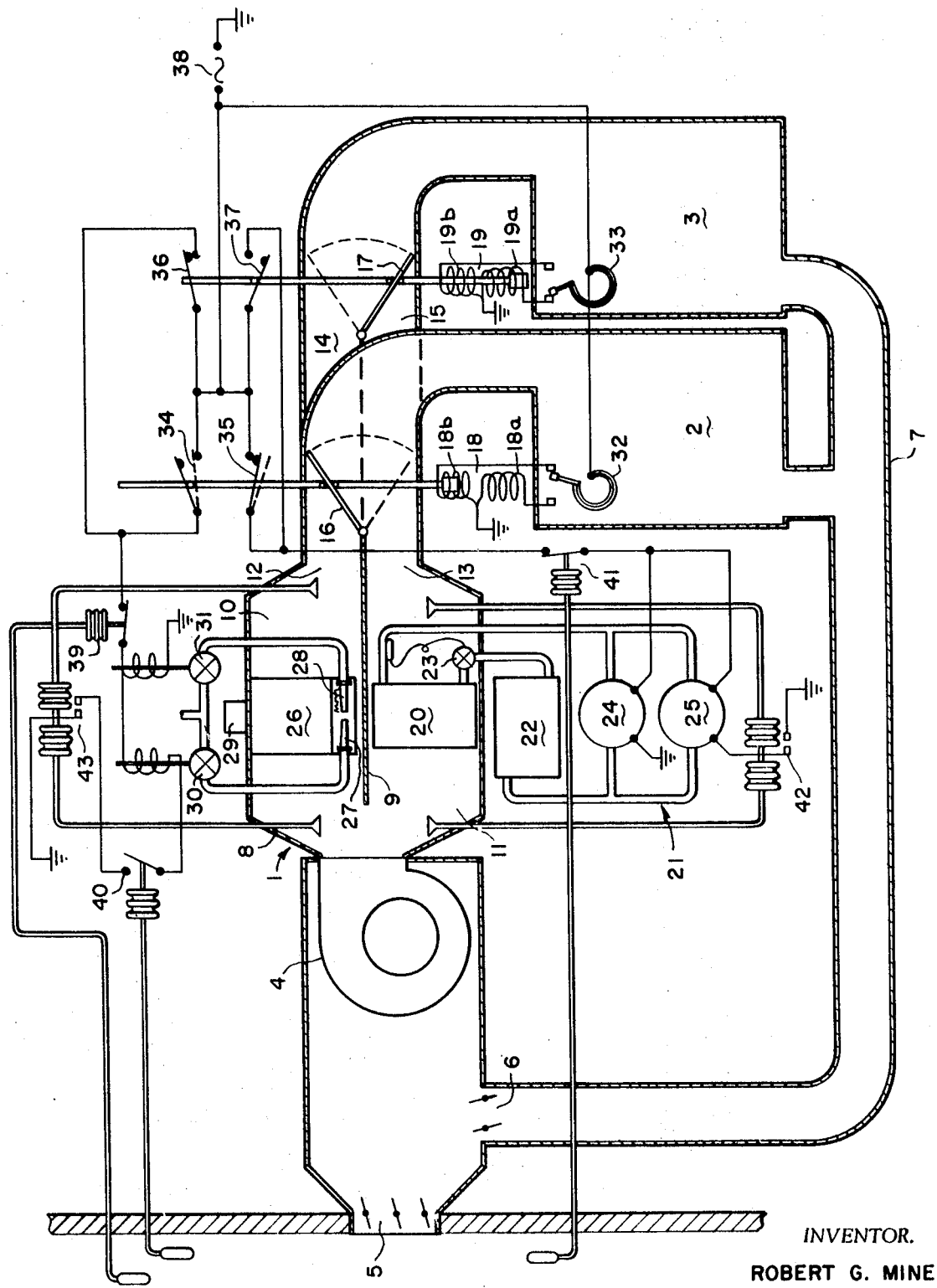
INVENTOR.
ROBERT G. MINER
BY
Carl M. Lewis
ATTORNEY

MULTIZONE AIR CONDITIONING APPARATUS

In multizone air-conditioning units it is common practice to provide a heating deck and a cooling deck. A number of separate zones to be air conditioned are connected to the outlet of each of the heating and cooling decks thereby providing each zone with a source of cooling air and a source of heating air to permit individual zone temperature control. The control is effected via a damper means which controls the proportion of heating and cooling air in response to a zone thermostat. The total amount of heating air or the total amount of cooling air required for all zones will, of course, depend upon the number of zones which momentarily are demanding heating or cooling.

Conventionally it has been the practice to control the amount of heat exchanger fluid supplied to the heating or cooling deck in response to the position of the dampers for the individual zones. This has been done by way of switches associated with the dampers for each of the air conditioned zones. If the dampers are of the proportioning type, that is supply simultaneously both heating and cooling air, it is often necessary to substitute variable resistance elements for each of the damper switches. In any event, the contorls become increasingly complicated with the number of zones served by the air conditioning apparatus.

The instant invention is a simplified means for summing up the demand for heating and cooling air. This is accomplished simply by measuring the pressure differential across the respective heat exchangers and accordingly supplying the proper amount of heat exchange medium to such heat exchangers.

It is thus a primary object of this invention to provide a simplified control for multizone air-conditioning units.

It is a further object of this invention to provide a multizone air conditioning system in which the quantity of heat exchange medium supplied to the unit is varied in response to the aggregate demand of the separate zones as sensed by the pressure differential across the air conditioning unit heat exchanger.

And it is still a further object of this invention to provide a control system for a multizone air conditioning system in which the heating and cooling input is controlled by the air quantity through the heat exchangers thereof.

Now referring to the sole FIGURE of the drawings, it will be seen that multiple zone air conditioning apparatus 1 for air-conditioning zones 2 and 3 has a blower 4. The inlet side of blower 4 is connected to a fresh air inlet 5 and a return air inlet 6. Return air inlet 6 communicates with each of zones 2 and 3 via return air conduit 7. Inlet 5 and inlet 6 may each be provided with appropriate dampers if desired. The mixture of return air and fresh air is discharged from blower 4 into the end of chamber 8. Chamber 8 is divided by a partition 9 into a warm air deck 10 and a cool air deck 11. Zone 2 communicates with warm air deck 10 via first warm air conduit 12 and with cool air deck 11 via first cool air conduit 13. In like manner zone 3 communicates with warm air deck 10 via second warm air conduit 14 and with cool air deck 11 via second cool air conduit 15. A first control damper 16 is arranged to control the proportions of warm and cool air passing from chamber 8 to zone 2. A second control damper 17 is arranged to control the proportions of warm and cool air passing from chamber 8 to zone 3. A thermostatically controlled first damper actuator 18 responsive to the temperature of zone 2 is arranged to position damper 16. A second thermostatically controlled damper actuator 19 responsive to the temperature of zone 3 is arranged to control the position of damper 17. Actuators 18 and 19 will be explained in more detail in connection with the operation of the multizone air conditioning apparatus.

Cool air deck 11 has a cooling heat exchanger 20. In this particular instance cooling heat exchanger 20 is the evaporator of a refrigeration system 21. Refrigeration system 21 has a closed refrigerant circuit including a refrigerant condenser 22, refrigerant throttling means such as temperature-responsive expansion valve 23, evaporator or cooling heat exchanger 20, and a pair of parallel refrigerant compressors 24 and 25. During operation of the refrigeration system 21 hot compressed refrigerant is delivered from at least one of the compressors 24 and 25 to condenser 22. Condensed refrigerant from condenser 22 passes through expansion valve 23 to a lower pressure in evaporator 20 whereupon the condensed refrigerant is evaporated by heat removed from the air passing through the cooling deck. The vaporized refrigerant then is returned to the suction side of the compressors for recompression. The controls for compressors 24 and 25 will be described in connection with the operation of the multizone air conditioning apparatus.

A heating heat exchanger 26 is disposed in the warm air deck 10 of chamber 8 for heating air passing through the warm air deck. Heat exchanger 26 is heated by way of one or both of gas burners 27 and 28 and may be provided with a flue 29 as required. Gas burners 27 and 28 are connected to a source of fuel by way of solenoid valves 30 and 31 respectively. It is to be assumed that burners 27 and 28 are associated with a pilot or other type ignition system not shown. The control means for valves 30 and 31 will be described in detail in the operation of the multizone air conditioning system.

OPERATION

Let it be assumed that the outdoor temperature is between 55° and 65° F. and that blower 4 is operating to pass air through heating heat exchanger 26 and cooling heat exchanger 20. Should the temperature within conditioned zone 2 fall below the set point for minimum temperature, thermostat 32 will close a circuit with power source 38 to energize solenoid coil 18a of damper actuator 18 thereby moving switches 34, 35 and damper 16 to the dotted line positions whereby warm air from deck 10 is conducted to zone 2 until the maximum temperature set point of thermostat 32 is reached. When the temperature in condition zone 2 reaches the maximum temperature set point, thermostat 32 will then move to the position shown energizing solenoid coil 18b thereby actuating damper 16 and switches 34 and 35 to the solid line position shown whereby cool air is conducted from cooling deck 11 to zone 2. Actuator 18 has been shown in its simplest form for purposes of illustration as having two extreme positions. However, in practice actuator 18 may be an infinite position reversible damper motor so that damper 16 may be actuated to any intermediate position whereby the proportions of warm and cool air delivered to zone 2 may be infinitely altered.

The manner of operation of damper 17 and associated switches 36 and 37 by damper actuator 19 having solenoid coils 19a and 19b in response to the position of zone thermostat 33 may be essentially identical to that of the corresponding elements herein described with respect to zone 2.

It should be noted that when no zone is demanding heating both switches 34 and 36 are open and that when no zone is calling for cooling both switches 35 and 37 are open. Now let it be assumed that zone 2 is demanding cooling and zone 3 is demanding heating and that dampers 16 and 17 and switches 34, 35, 36, and 37 are in the position shown in solid line. A first circuit is established including power source 38, switch 36, outdoor temperature-responsive thermostat 39, and solenoid valve 31 whereby valve 31 is opened to allow fuel gas to flow to burner 28 thereby heating heat exchanger 26. Outdoor thermostat 39 may be adjusted to be open F. outdoor temperatures above about 65° F. and closed at outdoor temperatures below 65° F. Another outdoor temperature-responsive thermostat 40 is adjusted to be closed at outdoor temperatures below about 40° F. and open at outdoor temperatures above 40° F. Since thermostat 40 remains open no circuit is established through solenoid valve 30. Another circuit is established including power source 38, switch 35, outdoor thermostat 41, and compressor 24 thereby activating refrigeration system 21 to cool evaporator heat exchanger 20. Outdoor thermostat 41 may be adjusted to be closed at outdoor temperatures above 55° F. and open at outdoor temperatures below about 55° F.

Should all zones be sufficiently warm that switches 34 and 36 are open or should the outdoor temperature rise above 65° F. thereby opening outdoor thermostat 39, the power circuit to solenoid valves 30 and 31 will be deenergized thereby deactivating heat exchanger 26. In the alternative should the temperature in all zones be sufficiently cool that switches 35 and 37 are open or should the outdoor temperature fall below 55° F. opening outdoor thermostat 41, the power circuit energizing the compressors 24 and 25 is deenergized thereby deactivating refrigeration system 21 and thus deactivating heat exchanger 20.

Now once again assume the components to be in the position as shown on the drawing. Should zone 3 become sufficiently warm that damper 17 is moved toward the dotted line position, additional quantities of cool air must flow from chamber 8 and the flow rate through cooling heat exchanger 20 will increase thereby establishing a larger pressure differential between the upstream and downstream sides of heat exchanger 20. If the demand by the zones for cooling air is sufficiently great to establish a predetermined pressure differential across heat exchanger 20, pressure differential switch 42 will be closed thereby energizing second compressor 25 to increase the cooling capacity for refrigeration system 21. Should the demand for cooling air as measured by the pressure differential across heat exchanger 20 decrease below a predetermined value, pressure differential switch 42 will once again open thereby deenergizing compressor 25 to reduce the refrigerating capacity of refrigeration system 21.

Once again assume the system components in the position shown. Should the temperature within zone 2 fall sufficiently so that damper 16 is moved toward the dotted line line position, the airflow within warming deck 10 will increase thereby increasing the pressure differential across heating heat exchanger 26. The increased pressure differential across heat exchanger 26 will close pressure differential switch 43. If the outdoor temperature is below 40° F. outdoor thermostat 40 will be closed and a circuit is established energizing the second solenoid valve 30 to the open position directing fuel gas to burner 27 to raise the heating capacity of heat exchanger 26. Should the demand by the zones for heating be reduced below a predetermined value as measured by the pressure differential across heat exchanger 26, pressure differential switch 43 will open thereby deenergizing valve 30 and shutting down burner 27 to reduce the heating capacity of heat exchanger 26.

It should be clear that the temperature set points described herein for thermostats 39, 40, and 41 are merely representative and may be altered as desired. Thus although I have described in detail the preferred embodiment of my invention, I contemplate that many changes may be made without departing from the scope or spirit of my invention and I accordingly desire to be limited only by the claims.

I claim:

1. Apparatus for air conditioning first and second zones comprising: a first heat exchanger means for heating air passing therethrough; a second heat exchanger means for cooling air passing therethrough; first warm air conduit means for conducting warm air from said first heat exchanger means toward said first zone; second warm air conduit means for conducting warm air from said first heat exchanger means toward said second zone; first cool air conduit means for conducting cool air from said second heat exchanger means toward said first zone; second cool air conduit means for conducting cool air from said second heat exchanger means toward said second zone; first airflow control means for controlling the flow of air through said first warm and cool air conduit means; second airflow control means for controlling the flow of air through said second warm and cool air conduit means; means for actuating said first airflow control means in response to a temperature condition of said first zone; means for actuating said second airflow control means in response to a temperature condition of said second zone; on air blower means for blowing air; a conduit disposed at one end in fluid communication with the outlet of said blower means and at the other end in fluid communication with each of said first and second heat exchanger means; first airflow sensing means for sensing the rate of airflow through one of said heat exchanger means; and means responsive to said airflow-sensing means for varying the rate of heat transfer medium supplied to said one heat exchanger means in response to said airflow-sensing means whereby the quantity of heat exchange medium supplied to said one heat exchanger means is controlled in response to the demand on said one heat exchanger means by both of said zones via a single sensing means.

2. Apparatus as defined by claim 1 wherein said first airflow-sensing means is a pressure differential switch responsive to the difference between the air pressure upstream and downstream of said one heat exchanger means.

3. Apparatus as defined by claim 1 further comprising: second airflow-sensing means for sensing the rate of airflow through the other of said heat exchanger means; and means responsive to said second airflow-sensing means for varying the rate of heat transfer medium supplied to said other of said first and second heat exchanger means in response to said second airflow sensing means whereby the quantity of heat exchange medium supplied to said other heat exchanger means is controlled indirectly in response to the demand on said other heat exchanger means by both of said zones via a single sensing means.

4 Apparatus as defined in claim 3 wherein said first airflow-sensing means is a pressure differential switch responsive to the difference between the air pressure upstream and downstream of said one heat exchanger means and said second airflow-sensing means is a pressure differential switch responsive to the difference between the air pressure upstream and downstream of said other heat exchanger means.

5. Apparatus for air conditioning first and second zones comprising: a first heat exchanger means for heating air passing therethrough; a second heat exchanger means for cooling air passing therethrough; first warm air conduit means for conducting warm air from said first heat exchanger means toward said first zone; second warm air conduit means for conducting warm air from said first heat exchanger means toward said second zone; first cool air conduit means for conducting cool air from said second heat exchanger means toward said first zone; second cool air conduit means for conducting cool air from said second heat exchanger means toward said second zone; first airflow control means for controlling the flow of air through said first warm and cool air conduit means; second airflow control means for controlling the flow of air through said second warm and cool air conduit means; means for actuating said first airflow control means in response to a temperature condition of said first zone; means for actuating said second airflow control means in response to a temperature condition of said second zone; an air blower means for blowing air; a conduit disposed at one end in fluid communication with the outlet of said blower means and at the other end in fluid communication with each of said first and second heat exchanger means; first airflow-sensing means for sensing the rate of airflow through one of said heat exchanger means; supply means for supplying said one heat exchanger means with a heat exchange medium at a first supply rate; supplemental supply means for supplying said one heat exchanger with additional heat exchange medium to establish a second discrete supply rate higher than said first supply rate; and means responsive to said airflow-sensing means for actuating said supplemental supply means in response to said airflow-sensing means whereby the level of heat exchange medium supplied to said one heat exchanger means is controlled in response to the demand on said one heat exchanger means by both of said zones via a single sensing means.

6. The apparatus as defined by claim 5 wherein said airflow-sensing means includes means for sensing the pressure differential across said heat exchanger means.

7. Apparatus for air conditioning first and second zones comprising: a heat exchanger means for cooling air passing therethrough; first cool air conduit means for conducting cool air from said heat exchanger means toward said first zone; second cool air conduit means for conducting cool air from said heat exchanger means toward said second zone; first airflow control means for controlling the flow of air through said first cool air conduit means; second airflow control means for controlling the flow of air through said second cool air conduit means; means for actuating said first airflow control means in response to a temperature condition of said first zone; means for actuating said second airflow control means in response to a temperature condition of said second zone; an air blower means for blowing air; a conduit disposed at one end in fluid communication with the outlet of said blower means and at the other end in fluid communication with each of said heat exchanger means; airflow-sensing means for sensing the rate of airflow through said heat exchanger means; supply means for supplying a cooling heat exchange medium to said heat exchanger means at a first supply rate; supplemental supply means for supplying said heat exchanger with additional cooling heat exchange medium at a second discrete supply rate higher than said first supply rate; and means responsive to said airflow-sensing means for actuating said supplemental supply means in response to said airflow-sensing means whereby the level of heat exchange medium supplied to said heat exchanger means is controlled in response to the the cooling demand on said heat exchanger means by both of said zones via a single sensing means.

8. The apparatus as defined in claim 7 wherein said airflow-sensing means includes means for sensing the pressure differential across said heat exchanger means.

9. Apparatus for air conditioning first and second zones comprising: a first heat exchanger means for heating air passing therethrough; a second heat exchanger means for cooling air passing therethrough; first warm air conduit means for conducting warm air from said first heat exchanger means toward said first zone; second warm air conduit means for conducting warm air from said first heat exchanger means toward said second zone; first cool air conduit means for conducting cool air from said second heat exchanger means toward said first zone; second cool air conduit means for conducting cool air from said second heat exchanger means toward said second zone; first airflow control means for controlling the flow of air through said first warm and cool air conduit means; second airflow control means for controlling the flow of air through said second warm and cool air conduit means; means for actuating said first airflow control means in response to a temperature condition of said first zone; means for actuating said second airflow control means in response to a temperature condition of said second zone; an air blower means for blowing air; a conduit disposed at one end in fluid communication with the outlet of said blower means and at the other end in fluid communication with each of said first and second heat exchanger means; and means for varying the rate of heat transfer medium supplied to one of said heat exchanger means indirectly in response to the rate of airflow through the other of said heat exchanger means via a single sensing means.

10. The apparatus as defined by claim 9 wherein said single sensing means is a pressure differential sensing means responsive to the pressure differential upstream and downstream of one heat exchanger means.